(12) United States Patent
De Koeijer et al.

(10) Patent No.: US 8,402,766 B2
(45) Date of Patent: *Mar. 26, 2013

(54) PROCESS FOR PRODUCTION OF ELECTRIC ENERGY AND $CO_2$ FROM A HYDROCARBON FEEDSTOCK

(75) Inventors: Gelein De Koeijer, Trondheim (NO); Erling Rytter, Trondheim (NO); Borge Rygh Sivertsen, Stavanger (NO); Henrik Kobro, Stavanger (NO)

(73) Assignee: Statoil ASA, Stavanger (NO)

( * ) Notice: Subject to any disclaimer, the term of this patent is extended or adjusted under 35 U.S.C. 154(b) by 271 days.

This patent is subject to a terminal disclaimer.

(21) Appl. No.: 12/897,139

(22) Filed: Oct. 4, 2010

(65) Prior Publication Data

US 2011/0023498 A1 Feb. 3, 2011

Related U.S. Application Data

(63) Continuation of application No. 11/911,976, filed as application No. PCT/NO2006/000143 on Apr. 19, 2006, now Pat. No. 7,827,804.

(30) Foreign Application Priority Data

Apr. 19, 2005 (NO) .................................. 20051895

(51) Int. Cl.
*F02C 1/00* (2006.01)

(52) U.S. Cl. .......................................... 60/772; 60/780

(58) Field of Classification Search ................ 60/39.12, 60/780–784, 772
See application file for complete search history.

(56) References Cited

U.S. PATENT DOCUMENTS

| | | | |
|---|---|---|---|
| 4,973,453 | A | 11/1990 | Agee |
| 5,392,594 | A | 2/1995 | Moore et al. |
| 5,865,878 | A | 2/1999 | Drnevich et al. |
| 5,901,547 | A | 5/1999 | Smith et al. |
| 6,277,894 | B1 | 8/2001 | Agee et al. |
| 6,296,686 | B1 | 10/2001 | Prasad et al. |
| 6,767,527 | B1 | 7/2004 | Asen et al. |
| 6,989,135 | B2 | 1/2006 | Kennedy |
| 2001/0042367 | A1 | 11/2001 | Frutschi et al. |
| 2003/0039608 | A1 | 2/2003 | Shah et al. |
| 2004/0177555 | A1 | 9/2004 | Knez et al. |
| 2005/0210881 | A1* | 9/2005 | Balan et al. .................. 60/780 |
| 2005/0235650 | A1 | 10/2005 | Griffin et al. |
| 2006/0064985 | A1* | 3/2006 | Buecker et al. ............... 60/772 |
| 2006/0185369 | A1 | 8/2006 | Ahmed et al. |

FOREIGN PATENT DOCUMENTS

| | | |
|---|---|---|
| JP | 09303115 | 11/1997 |
| JP | 2003081605 | 3/2003 |
| WO | 9941188 | 8/1999 |
| WO | 0018680 | 4/2000 |
| WO | 0202460 A2 | 1/2002 |
| WO | 02072470 A1 | 9/2002 |

* cited by examiner

*Primary Examiner* — Phutthiwat Wongwian
(74) *Attorney, Agent, or Firm* — Volpe and Koenig, P.C.

(57) ABSTRACT

A process for production of electric energy and $CO_2$ from a hydrocarbon feedstock includes steam reforming of the feedstock, separation and combustion of hydrogen, and separation of $CO_2$.

19 Claims, 7 Drawing Sheets

Figure 1:
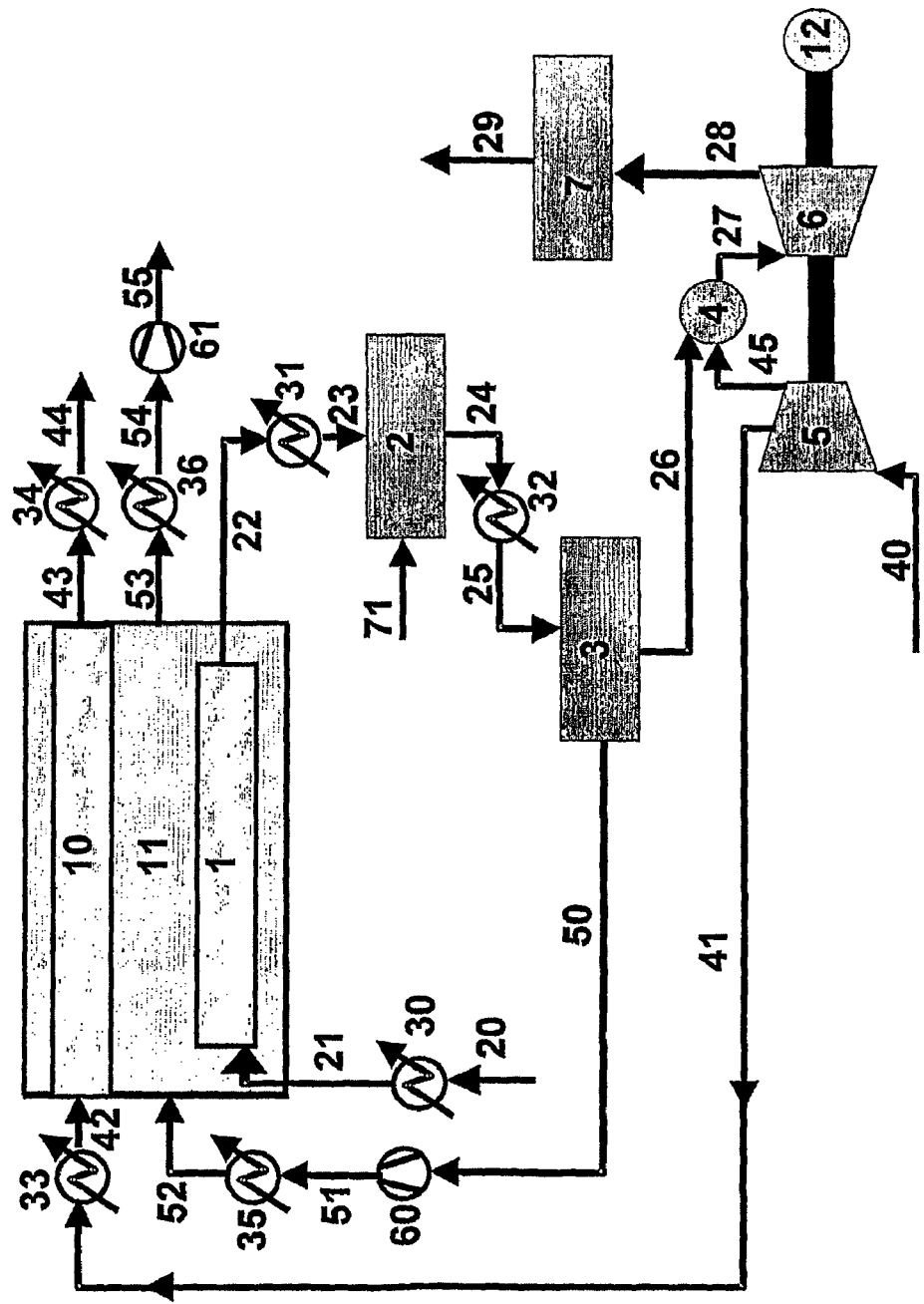

PROCESS FOR PRODUCTION OF ELECTRIC ENERGY AND CO$_2$ FROM A HYDROCARBON FEEDSTOCK

CROSS REFERENCE TO RELATED APPLICATION(S)

This application is a continuation of U.S. patent application Ser. No. 11/911,976, Jan. 9, 2008, which is a 35 USC 371 application of PCT/NO2006/000143, filed Apr. 19, 2006, which are incorporated by reference as if fully set forth.

FIELD OF INVENTION

The present invention relates to a hydrogen power plant and a process for electric energy production comprising steam reforming of a hydrocarbon feedstock and production of a CO$_2$ rich exhaust stream.

BACKGROUND

The burning of fossil fuels and release of carbon dioxide into the atmosphere is being associated with global warming and the thereto connected environmental problems. The interest in the development of so called CO$_2$ free solutions is increasing due to the increasing awareness of these problems.

SUMMARY

A major technical problem associated herewith is the difficulty of separating nitrogen from carbon dioxide. One solution to this problem is a pre-combustion plant, where the CO$_2$ is removed from a synthesis gas, and where the remaining hydrogen is used for electricity production. The nitrogen-CO$_2$ mixture is prevented from being formed in this process.

WO 00/18680 discloses a process for preparing a hydrogen rich gas and a carbon dioxide rich gas at high pressure comprising separation of synthesis gas obtained by autothermal reforming, air-fired steam reforming or partial oxidation. Further this publication teaches the use of nitrogen for diluting the hydrogen before combustion. How this nitrogen stream is obtained or the quality thereof is not described.

WO 99/41188 teaches the use of steam reforming in connection with a hydrogen fueled power plant. Further this publication teaches separating of the obtained synthesis gas into a hydrogen rich stream and a carbon dioxide rich stream with chemical absorption. Part of the obtained hydrogen is used as fuel for heating the steam reformer by combusting the hydrogen with air.

JP2003081605 discloses a hydrogen manufacturing method with a steam reformer. The aim of the process is to use the cooling energy present in liquefied natural gas (LNG) to obtain liquid carbon dioxide and hydrogen. The obtained synthesis gas is separated by pressure swing adsorption into a hydrogen rich stream and a rest stream. The rest stream is combusted using pure oxygen or high-density oxygen for heating the steam reformer. Thereby a CO$_2$ rich exhaust is produced which is cooled by the cooling energy. The pure or high-density oxygen is produced by cryogenic air separation also using the cooling energy. The use of hydrogen as fuel in a power plant is not disclosed.

U.S. Pat. No. 6,296,686 disclose a process for providing an endothermic reaction including transporting oxygen from an air stream through an oxygen selective membrane. Heat is provided by combusting a fuel with either the oxygen transported through the membrane or the rest of the air stream. The object of the process is to provide syngas with a H$_2$/CO molar ratio that requires more heat then the reformation itself can provide and at the same time minimize the formation of NO$_x$. In the described process the flue gas comprises a mixture of combustion products including CO$_2$ and nitrogen from the air stream.

The aim of the present invention is to provide a process for electric energy production from a hydrocarbon feedstock comprising recovery of produced CO$_2$ in form of a CO$_2$ rich stream that can be stored or used elsewhere. Further the aim is to provide a process that separates synthesis gas from a steam reformer into a carbon-lean fuel for a turbine, which mainly consists of hydrogen, and a rest stream. The rest stream is combusted for heating the steam reformer and for facilitating air separation into an oxygen rich stream, which is used in the previously mentioned combustion. Additionally the aim is to provide a process which can be adapted to at the same time produce a nitrogen rich stream, preferably oxygen free, for diluting the carbon-lean fuel before or during combustion to control combustion temperature and formation of nitrogen oxides.

In a first aspect the present invention provides a process for production of electric energy and CO$_2$ from a hydrocarbon feedstock comprising steam reforming of the feedstock producing synthesis gas, wherein the synthesis gas is separated into a hydrogen rich and carbon lean stream and a rest stream, said hydrogen rich and carbon lean stream is combusted with compressed air for producing a combustion product which is expanded in a turbine generating electric energy, said rest stream is recirculated as fuel for producing heat for said steam reforming, characterised in that an oxygen comprising stream is fed to an oxygen transfer membrane transferring oxygen for combusting said fuel, wherein said combustion also heats the oxygen transfer membrane, thereby creating a CO$_2$ rich combustion product and an oxygen lean stream.

In a second aspect the present invention provides a process for production of electric energy and CO$_2$ from a hydrocarbon feedstock comprising steam reforming of the feedstock producing synthesis gas, wherein the synthesis gas is separated into a hydrogen rich and carbon lean stream and a rest stream, said hydrogen rich and carbon lean stream is combusted with compressed air for producing a combustion product which is expanded in a turbine generating electric energy, said rest stream is recirculated as fuel for producing heat for said steam reforming, characterised in that an oxygen comprising stream is fed to an oxygen adsorbing material creating an oxygen lean stream, wherein said fuel is combusted with oxygen released from said oxygen adsorbing material, thereby creating a CO$_2$ rich combustion product.

In a third aspect the present invention provides an electric power plant comprising a steam reformer with an inlet for a hydrocarbon feedstock including water and/or steam and an outlet for synthesis gas, said outlet for synthesis gas is in communication with a hydrogen separation unit having an outlet for a hydrogen rich and carbon lean stream and an outlet for a rest stream, said outlet for a hydrogen rich and carbon lean stream is in communication with a combustion chamber for combusting hydrogen with compressed air having an outlet connected to a turbine for generating electric power, said outlet for a rest stream is in communication with a combustion unit heat-transferringly connected to said steam reformer, characterised in that the plant further comprises an oxygen transfer membrane unit heat-transferringly connected to the combustion unit, wherein said membrane unit comprises an inlet for an oxygen containing stream and an outlet for an oxygen lean stream and a membrane for transferring oxygen to said combustion unit and said combustion unit has an exhaust outlet for a CO$_2$ rich exhaust stream.

In a fourth aspect the present invention provides an electric power plant comprising a steam reformer with an inlet for a hydrocarbon feedstock including water and/or steam and an outlet for synthesis gas, said outlet for synthesis gas is in communication with a hydrogen separation unit having an outlet for a hydrogen rich and carbon lean stream and an outlet for a rest stream, said outlet for a hydrogen rich and carbon lean stream is in communication with a combustion chamber for combusting hydrogen with compressed air having an outlet connected to a turbine for generating electric power, said outlet for a rest stream is in communication with a combustion unit heat-transferringly connected to said steam reformer, characterised in that the plant further comprises an oxygen adsorbing material arranged in side the combustion unit, wherein said combustion unit comprises an inlet for an oxygen containing stream and an outlet for an oxygen lean stream and an exhaust outlet for a $CO_2$ rich exhaust stream.

Other preferred embodiments of the present invention are described in the sub-claims.

In connection with the present invention the term "hydrocarbon feedstock" is meant to include natural gas, LNG, gasoline, nafta, methane, oil, and bio gas, preferable natural gas.

BRIEF DESCRIPTION OF THE DRAWING(S)

Figure 2:
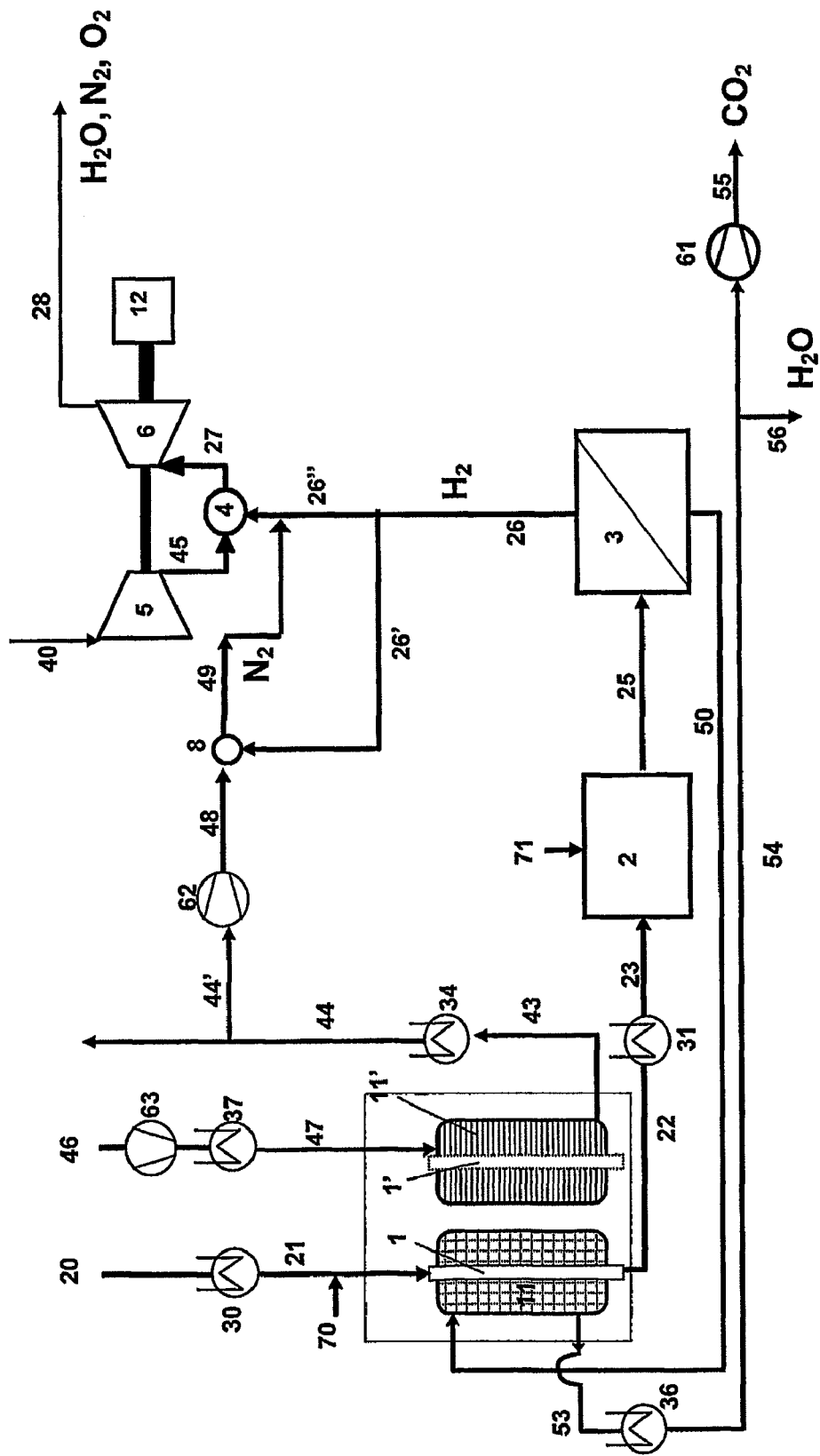
Figure 3:
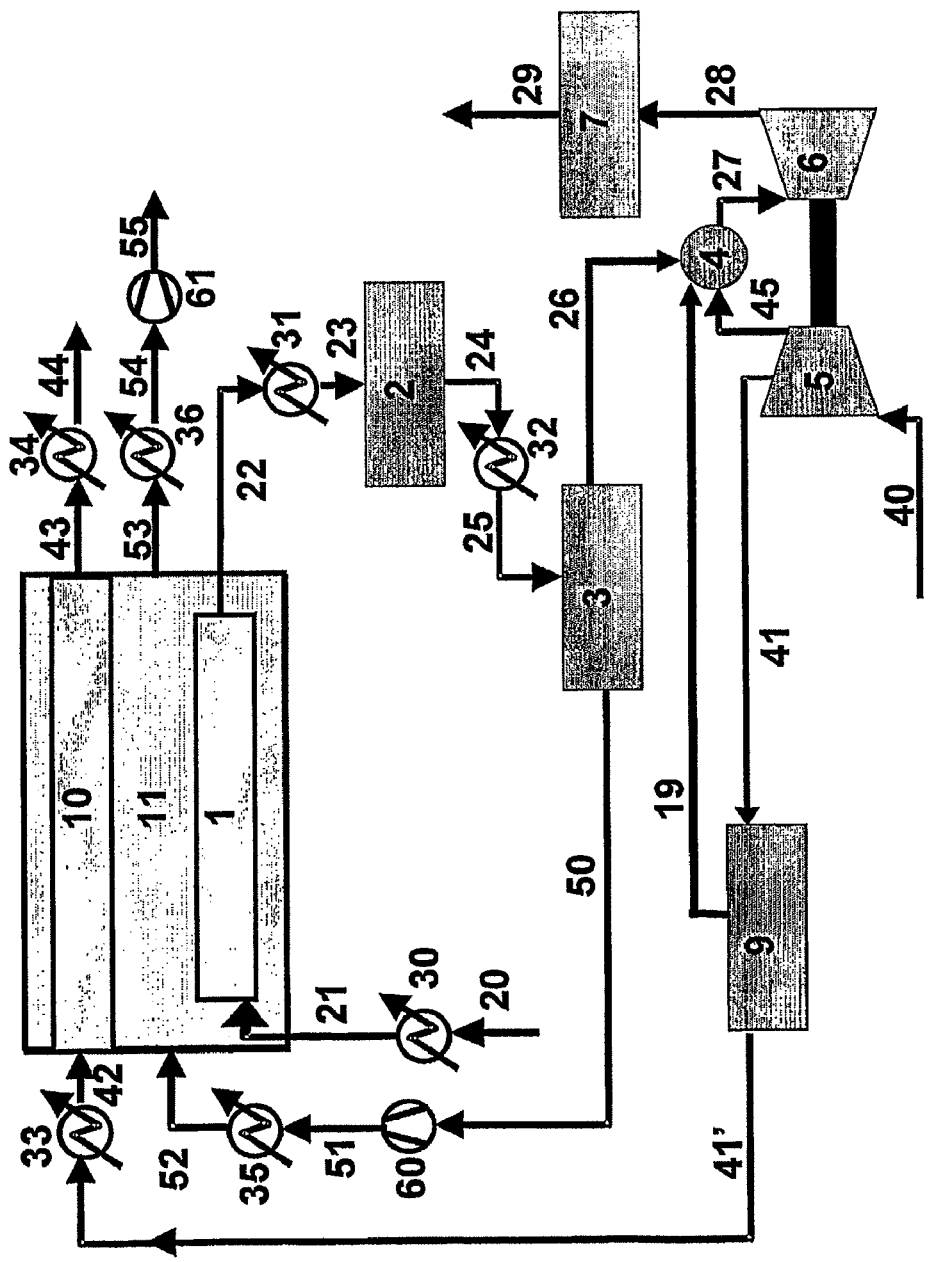
Figure 4:
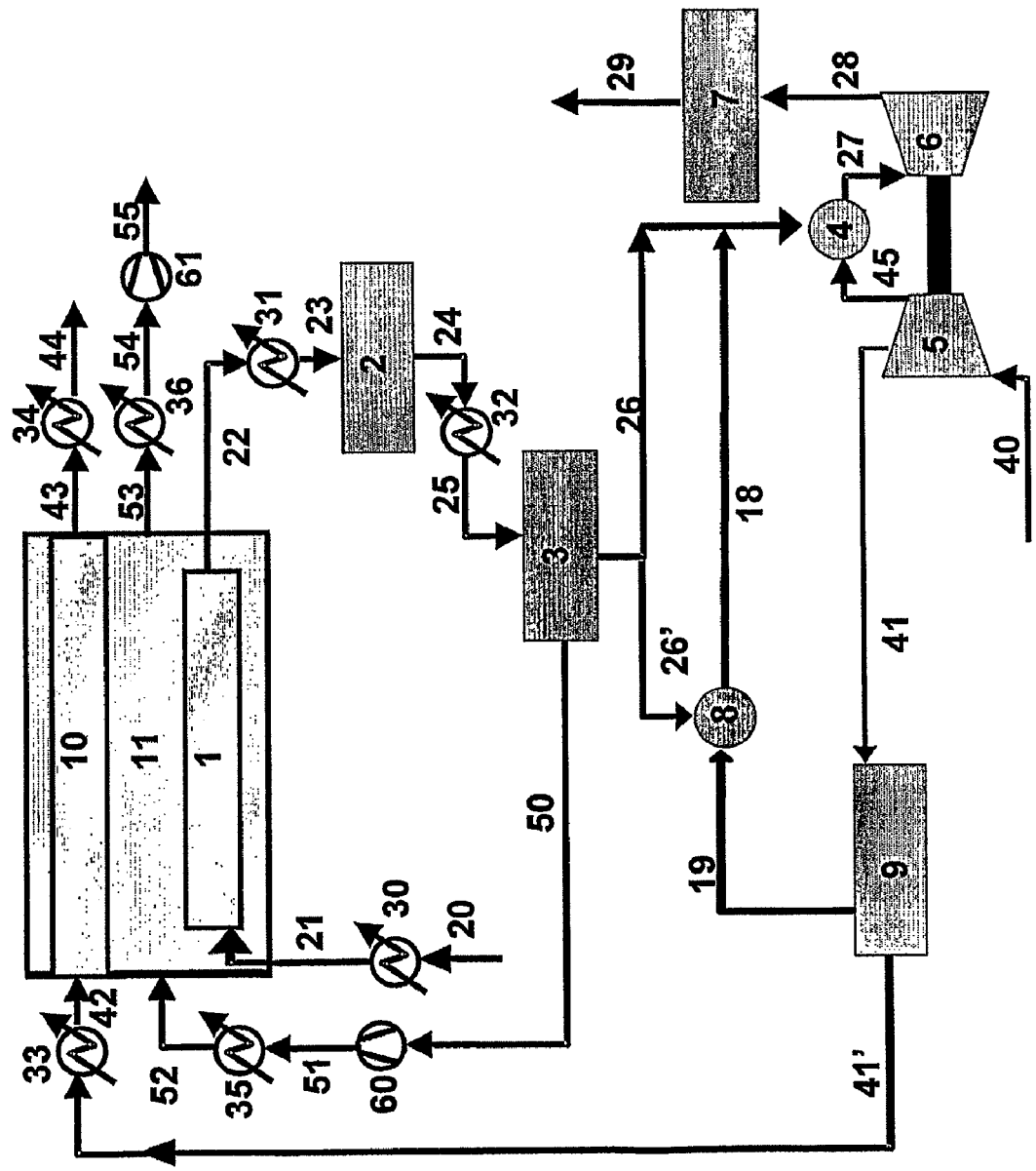
Figure 5:
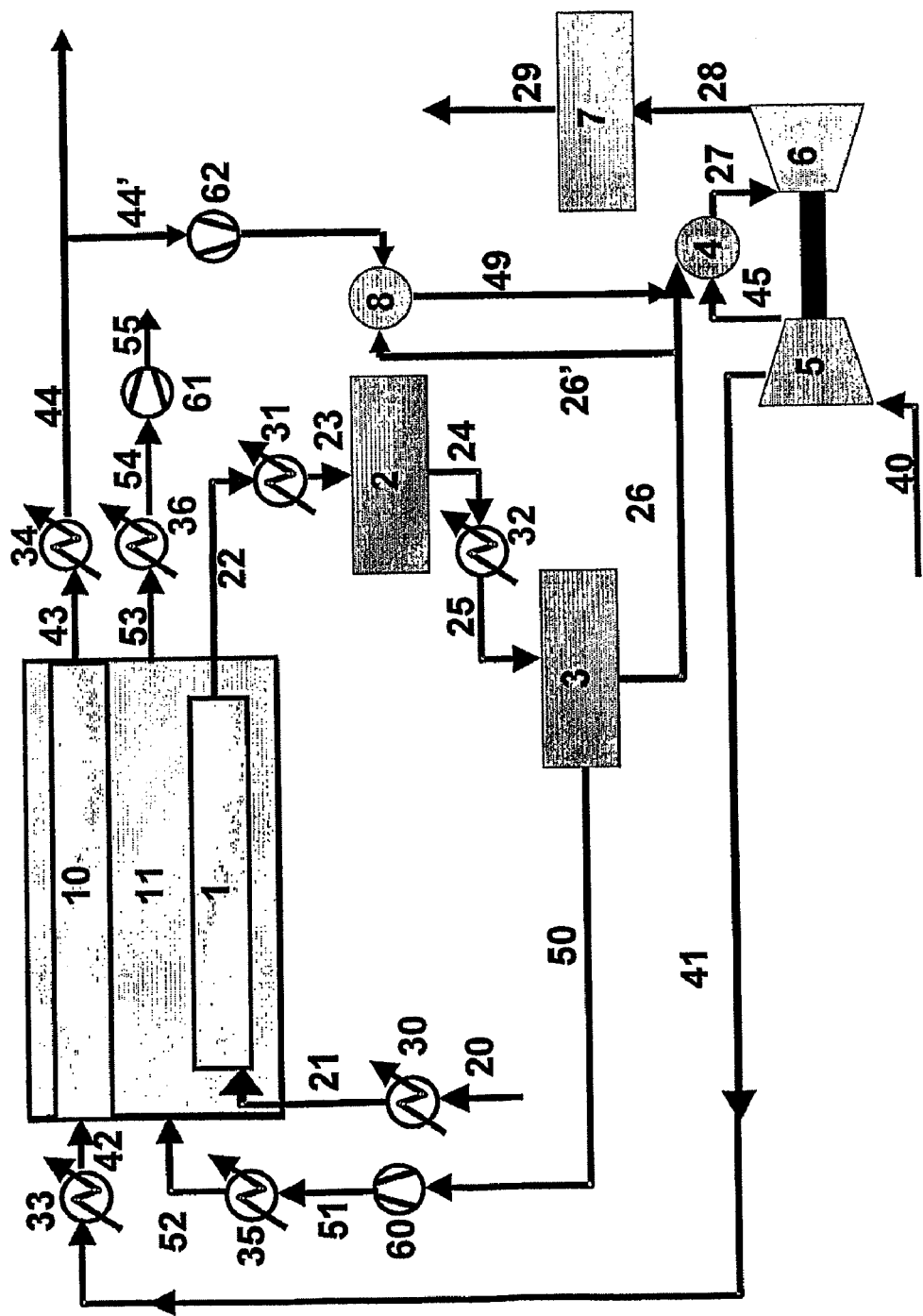
Figure 6:
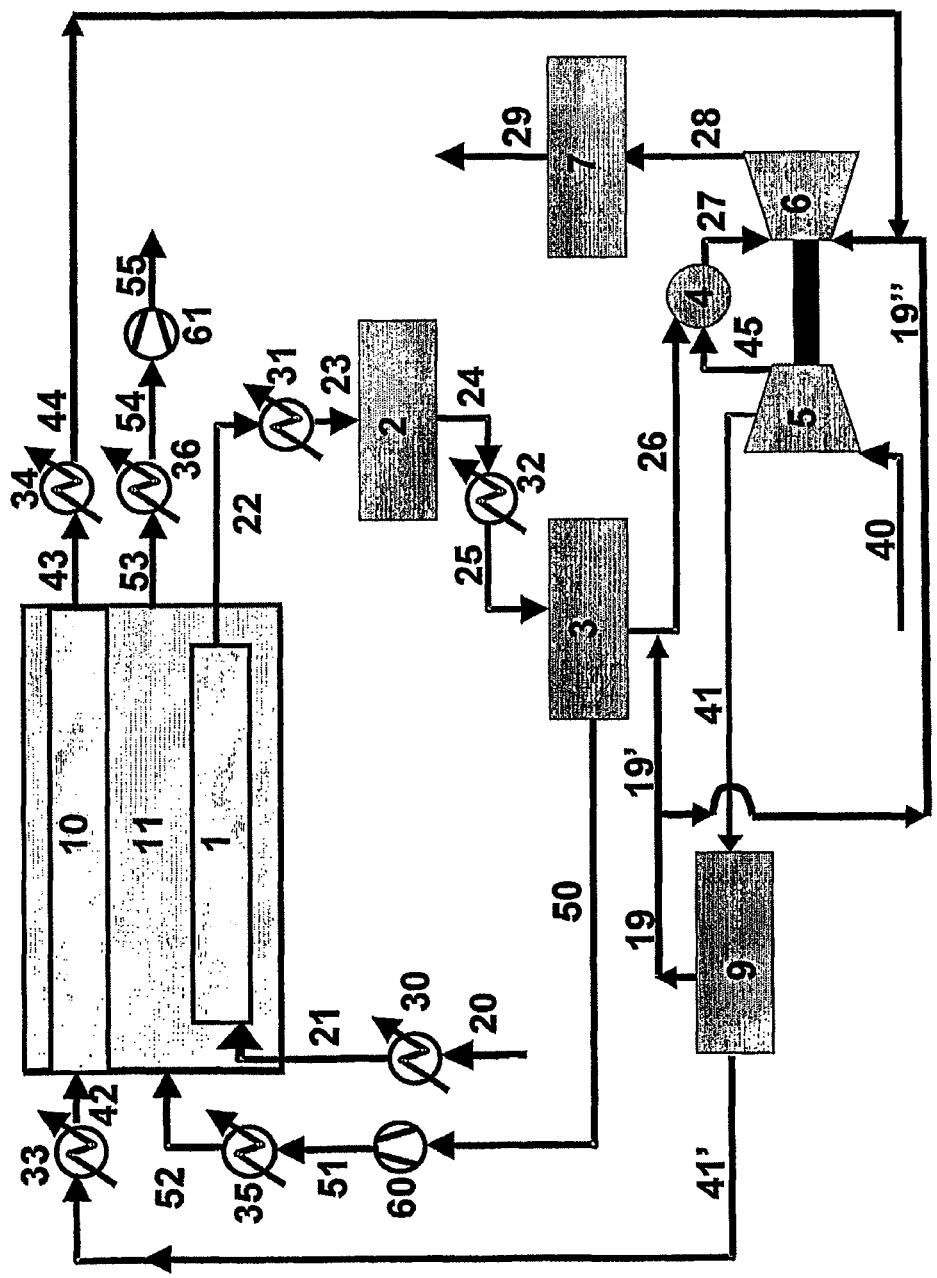
Figure 7:
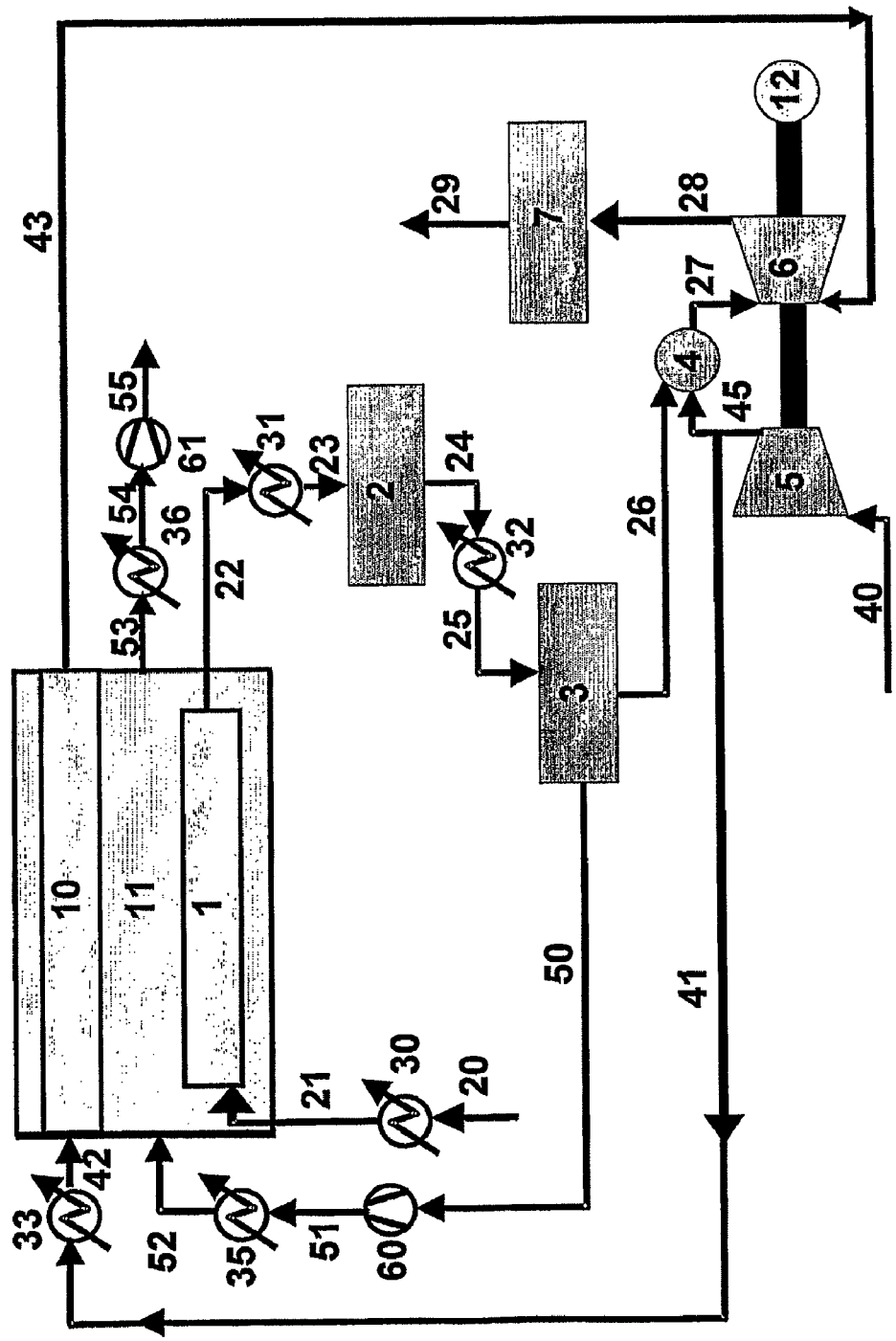

The present invention will be described in further detail with reference to the enclosed figures, where:

FIG. 1 shows a simplified flow sheet of a first embodiment of the present invention;
FIG. 2 shows a simplified flow sheet of a second embodiment of the present invention;
FIG. 3 shows a second version of the first embodiment;
FIG. 4 shows a third version of the first embodiment;
FIG. 5 shows a fourth version of the first embodiment
FIG. 6 shows a fifth version of the first embodiment; and
FIG. 7 shows a sixth version of the first embodiment.

DETAILED DESCRIPTION OF THE PREFERRED EMBODIMENT(S)

FIG. 1 illustrates a first embodiment of the present invention. Here an air stream 40 enters a compressor 5 generating a compressed air stream 45 which is entered into a combustion chamber 4. The compressor 5 may consist of more than one compressor unit. A hydrogen rich and carbon lean stream 26 is led into the combustion chamber 4. Combustion of hydrogen creates exhaust stream 27 which is expanded in a turbine 6. A generator 12 is coupled to the turbine 6. Preferably the generator, the turbine and the compressor are connected to a common shaft. An expanded exhaust stream 28 that leaves the turbine is preferably past into a heat recovery steam generator (HRSG) 7, where the heat contained in the exhaust is used for generating steam which is used for production of electric energy in a steam turbine. The exhaust stream 28 and possible cooled exhaust stream 29 do not contain more carbon dioxide than the amount that is economically viable or is set by regulators. The combustion product when using hydrogen as fuel is water which can be released to the surrounding environment without causing environmental problems.

A hydrocarbon feedstock together with steam is fed to the power plant through conduit 20, it is preferable heated in heat exchanger 30 and enters a steam reformer 1 through conduit 21. In the steam reformer synthesis gas is formed and the synthesis gas 22 is optionally cooled in a heat exchanger 31 before it optionally enters a shift reactor unit 2 as stream 23.

The shift reactor unit can comprise one or several stages, e.g. high and low temperature shift reactors. In the shift reactor unit the synthesis gas is shifted by forcing at least part of the CO and $H_2O$ to form $CO_2$ and $H_2$ under use of steam entered through conduit 71. The optionally shifted synthesis gas 24 is optionally heated or cooled in a heat exchanger 32 before it is fed as stream 25 into a hydrogen separation unit 3, like a distillation unit, a membrane unit or a pressure swing adsorption (PSA) unit, preferably a PSA unit. The separated hydrogen forms the carbon lean fuel stream 26 to the combustion chamber 4, which may contain maximum 20 mol % $CH_4$, CO or $CO_2$, but preferably less than 10 mol %. A rest stream 50 containing $CO_2$, CO, $H_2O$, $H_2$ and $CH_4$ is optionally compressed in compressor 60, compressed rest gas 51 is optionally preheated in heat exchanger 35 before it enters a combustion unit 11 as stream 52. The work needed to be performed by compressor 60 will depend on the pressure of the rest stream 50, the higher the pressure of stream 50 the less work compressor 60 has to perform. The rest stream 52 is combusted in the combustion unit 11 to heat the steam reformer 1 and an oxygen transfer membrane unit 10. As the rest gas is combusted using pure oxygen supplied by the oxygen transfer membrane unit the exhaust 53 from the combustion unit 11 will contain predominantly $H_2O$ and $CO_2$, and preferably less than 10 mol % uncombusted fuel and nitrogen, more preferred less than 5 mol % nitrogen. The amount of nitrogen depends on the nitrogen content of the feedstock, as this in principle is the only nitrogen source to the exhaust 53. The exhaust is preferably cooled in heat exchanger 36 and a cooled $CO_2$ rich stream 54 may be compressed in compressor 61 to obtain a compressed supercritical or liquefied $CO_2$ stream 55 that can be stored, injected into oil or gas containing formations to enhance production or used in any other way. Depending on the water content and the intended use of the stream 53, water can be removed from stream 54 for instance by inserting a condenser (not shown) downstream from the heat exchanger 36. In case uncombusted fuel and nitrogen are present in stream 53, they can optionally be removed in a compression process, e.g. by a relatively small distillation unit (not shown). Instead of directly cooling and compressing stream 53, it may optionally be expanded first in a $CO_2/H_2O$ turbine (not shown) that generates extra electricity. Subsequently $H_2O$ can be partially removed and the $CO_2$ recompressed. This option is preferred if the pressure and temperature of stream 53 are high, preferably above 4 bar and 900° C. In case uncombusted fuel is present in stream 53, the efficiency of this $CO_2/H_2O$ turbine can be optionally increased by combusting the uncombusted fuel (not shown).

Another air stream 41, which preferably is compressed either in the compressor 5, possibly taken out of the compressor as a bleed stream, or in another compressor (not shown) is fed to the oxygen transfer membrane unit 10, at least a part of the wall of said unit is comprised by an oxygen transfer membrane, which transports oxygen in the form of oxygen ions through the membrane and into the combustion unit 11. Preferably 60 to 99% of the oxygen present in stream 42 is transferred to combustion unit 11, more preferably 70 to 90%. Stream 43 can optionally be cooled in heat exchanger 34 and vented as stream 44.

The oxygen transfer membrane preferably comprises a ceramic membrane supported by a support layer. More preferred the opposite side of the support layer comprises a catalyst for the combustion process. An oxygen containing stream is past along the membrane which selectively transfers oxygen through the membrane and the support layer. Fuel, in this case the rest stream, is past along the opposite side of the membrane. Thereby the oxygen and the rest gas are brought in contact in the presence of the catalyst for enhancing the combustion. The immediate reaction of the oxygen enhances the flux of oxygen through the membrane. In a preferred embodiment the reactor comprising the steam reformer 1, the combustion unit 11 and the oxygen transfer membrane unit 10 is constructed to allow all the three streams to flow co-currently.

FIG. 2 illustrates the second embodiment of the present invention. Here an air stream 40 enters a compressor 5, is compressed and leaves the compressor as stream 45, which enters a combustion chamber 4. The exhaust from the combustion chamber is past through conduit 27 into a turbine 6. Here the exhaust is expanded creating electric energy in the generator 12. The compressor, the turbine and the generator are preferably coupled to the same shaft, as shown. The expanded exhaust stream 28 contains mainly $H_2O$, $N_2$ and $O_2$. The heat contained in the stream 28 may be utilised in a HRSG or in another process that requires heat. This second embodiment comprises preferably two steam reformers 1 and 1' surrounded by combustion units 11, 11' comprising an oxygen chemical/physical adsorbing/absorbing material. The two systems are operated in a dual mode, where one unit 11' is adsorbing oxygen, whereas the other steam reformer 1 is heated by burning fuel using oxygen released from the adsorption material in unit 11. A hydrocarbon feedstock stream 20 may be heated in heat exchanger 30 creating stream 21 before a steam and/or water stream 70 is added and the mixture of the two streams enter the steam reformer 1. In the steam reformer synthesis gas is formed and this leaves the reformer as stream 22. The synthesis gas is preferably cooled in heat exchanger 31 before it enters an optional shift reactor unit 2 as stream 23. The shift reactor unit can optionally comprise one or several stages, e.g. high and low temperature shift reactors. In the shift reactor unit 2 the equilibrium between $CO_2+H_2$ and $CO+H_2O$ is shifted towards $CO_2+H_2$ under use of steam entered through conduit 71. The optionally shifted synthesis gas 25 is separated in the hydrogen separation unit 3, into a hydrogen rich and carbon lean stream 26 and a rest stream 50. The unit 3 is preferably a pressure swing adsorption unit. Most preferred this unit 3 is operated under such conditions that the rest stream 50 has a pressure higher than atmospheric pressure, preferably with a pressure of 1.5-5 bar. The rest gas 50 contains mainly $H_2$, $CO_2$, CO, $H_2O$, $CH_4$. The rest stream 50 enters the combustion unit 11 as fuel. This creates an exhaust stream 53 mainly comprising $H_2O$ and $CO_2$. This stream is cooled in heat exchanger 36, and $H_2O$ is separated out as stream 56, while the rest of stream 54 is optionally compressed in compressor 61 before the $CO_2$ rich stream 55 is stored, or used for other purposes. The work needed to be performed by compressor 61 will depend on the pressure of the rest stream 50, the higher the pressure of stream 50 the less work compressor 61 has to perform. An air stream 46 is compressed in a compressor 63 and heated in a heat exchanger 37 before it enters the combustion unit 11' where at least part of the present oxygen is adsorbed. The oxygen depleted air stream leaves the combustion unit as stream 43, which is optionally cooled in heat exchanger 34. In a preferred embodiment at least a part of this air stream 44' is optionally compressed in compressor 62 and past on to a catalytic combustion unit 8 for catalytic combustion of the rest content of oxygen. The combustion is performed using a part of the produced hydrogen, stream 26'. Exhaust stream 49 from the combustion unit 8, containing mainly $N_2$ and $H_2O$, is used for diluting the hydrogen fuel stream 26" before or in the combustion chamber 4. By diluting the hydrogen it will be easier to control the combustion temperature and thereby control the creation of unwanted nitrogen oxides during the combustion. When the oxygen adsorbing material in combustion unit 11' is saturated with oxygen and all oxygen is desorbed and combusted in combustion unit 11, the operation of the two units 11 and 11' are shifted. In a preferred embodiment the reactor comprising the steam reformer 1, 1' and the combustion unit 11, 11' is constructed to allow the reforming and the combustion stream to flow co-currently. The air flow can be constructed counter-currently, co-currently, cross-currently or a combination thereof with multiple inlets. In a more preferred embodiment all three streams are constructed to flow co-currently.

FIG. 3 illustrates a preferred embodiment of the first embodiment shown on FIG. 1. Here an air separation unit 9 is inserted, wherein the compressed air stream 41 is separated into a first stream 41' with increased oxygen content and a second oxygen depleted stream 19. The first stream is heated in heat exchanger 33 before it enters the oxygen transfer membrane unit 10. The air separation unit 9 can be of any known type, for instance a pressure swing adsorption unit (PSA), a membrane unit or a distillation unit. The unit 9 is preferably a sloppy separation unit. By a sloppy separation unit is meant a unit where at least one of the streams has a purity of less than 98%. The second stream is mixed with the hydrogen stream 26 before, when or after it enters the combustion chamber 4. The aim of adding unit 9 is to obtain a nitrogen stream for diluting the hydrogen stream, and thereby allow better control over the combustion conditions and the possible unwanted creation of nitrogen oxides. Further this pre-separation decreases the volumes flowing through units 33, 10 and 34 and enhances the efficiency of the later oxygen separation, here performed in the oxygen transfer membrane unit 10. It is also possible to combine the second embodiment illustrated in FIG. 2 with an air separation unit. The air separation unit would be introduced before or after the compressor 63 on FIG. 2 and the obtained nitrogen stream can be used instead of stream 44' or instead of stream 49.

FIG. 4 illustrates a more preferred embodiment of the first embodiment of the present invention illustrated on FIG. 3. Here the nitrogen rich stream 19 obtained from the air separation unit is catalytically combusted in combustion unit 8 to remove all oxygen present. The combustion is performed using a side stream 26' of the produced hydrogen. The obtained oxygen free nitrogen stream 18 is used for diluting the hydrogen stream 26 before or in the combustion chamber 4.

FIG. 5 illustrates another version of the first embodiment. Here a part 44' of the optionally cooled oxygen depleted stream 44 is compressed in compressor 62, before it is catalytically combusted in combustion unit 8 using a hydrogen side stream 26'. The thereby created oxygen free nitrogen stream 49 is used for diluting the hydrogen stream 26 before or in the combustion chamber 4. Compressor 62 can be omitted by an increased pressure of stream 41. In this case the pressure of stream 49 is high enough for entering the combustion chamber 4 or turbine 6.

The process performed in the combustion unit 8 is stimulated low temperature combustion, where an oxygen containing nitrogen stream and a hydrogen stream is combusted to form an oxygen free nitrogen stream also containing some $H_2O$ for diluting the main hydrogen stream. A control system for controlling the flow of the different streams can be installed. The flow of the main hydrogen stream may be controlled by a valve arrange upstream or down stream from the point where the main hydrogen fuel stream is diluted. The flow of the main hydrogen stream may be controlled by a valve arrange upstream or downstream from the point where the main hydrogen fuel stream is diluted. In one embodiment all valves and other control means can be arranged upstream from the turbine which allows for use of a conventional turbine.

FIG. 6 illustrates another version of the first embodiment where at least a part of said oxygen lean stream 43, 44 or at least a part of said second essential nitrogen containing stream 19" is expanded in said turbine 6 for generating electric energy. It is also possible to combine these features with the second embodiment of the present invention.

FIG. 7 illustrates another version of the first embodiment. In case the pressure and temperature of stream 43 are high, preferably above 15 bar and 500° C. respectively, a part or the whole of the stream can be optionally expanded in turbine 6 for generating more electricity. It is also possible to combine this feature with the other versions of the first embodiment or with the second embodiment.

In any one of the embodiments of the present invention the turbine may be cooled by any cooling process using any available $CO_2$ lean stream without combustibles, for instance stream 41, 43, 44, 45, 47, 48, 49, 18 or 19.

One preferred aspect of the present invention is a combination of the first embodiment illustrated on FIG. 5 and the version illustrated on FIG. 7. In this embodiment the compressed air stream 41 is at a high pressure, preferably at the same pressure as stream 45. The heat exchanger 34 is omitted. A part of the oxygen lean stream 43 is past directly into the low temperature combustion unit 8 so that the compressor 62 is omitted. The rest of the oxygen lean stream is expanded in the turbine 6 for producing electric energy.

The optimised operation conditions for a power plant according to the present invention will in every case depend on the equipment that is used. The following examples show the conditions and results for one system. It will be obvious for a technician skilled in the art that these can vary considerably within the scope of the present invention. The examples are not to be considered limiting for the present invention.

EXAMPLE

In one embodiment of the present invention the operation conditions of the power plant illustrated on FIGS. 5 and 7 are as follows: Air at 15° C. enters the compressor 5 and is compressed until the air reaches 17 bara. Thereafter the air stream 45 is combusted with a fuel, which enters at 787° C. which is a mixture of streams 26 and 49 and contains 58 mol % hydrogen and 36% nitrogen. The undiluted fuel 26 contains 2 mol % $CH_4$. The nitrogen rich hot air 43 added to the turbine 43 is at 900° C., 18.8 bara, and contains 5 mol % $O_2$. Compressor 62 is not necessary in this case. The exhaust 28 into the HRSG 7 is 582° C., and leaves at 97° C. as stream 29. The PSA 3 operates at 50° C., producing a rest stream 50 at 2.2 bara with 16 mol % $CH_4$, 56% mol % $CO_2$, 22 mol % $H_2$ and 4 mol % CO. The pressurized rest stream 51 is at 20 bara. The temperature of the synthesis gas 24 out of the shift reactors 2 is 250° C. The synthesis gas 22 out of the steam reformer is 900° C. and contains 50 mol % $H_2$, 17 mol % CO, 26 mol % $H_2O$ and 5.5 mol % $CH_4$. The entrance conditions of stream 21 into the steam reformer 1 are 550° C., 32.5 bara and a steam-to-carbon ratio of 1.8. The temperature through the combustion unit 11 increases from 650 to 1000° C. The air 42 is entered to the oxygen transfer membrane at 890° C. and 20 bara. The $CO_2$ 55 is compressed to 200 bara.

In this particular case 94% of all produced $CO_2$ is captured, and the lower heating value net energy efficiency in this example is 49%, including $CO_2$ compression and internal losses.

What is claimed is:

1. A process for production of electric energy and $CO_2$ from a hydrocarbon feedstock comprising steam reforming of the feedstock producing synthesis gas, wherein the synthesis gas is separated into a hydrogen rich and carbon lean stream and a rest stream, said hydrogen rich and carbon lean stream is combusted with compressed air for producing a combustion product which is expanded in a turbine generating electric energy, said rest stream is recirculated as fuel that feeds to a combustion unit for producing heat for said steam reforming, wherein a stream comprising oxygen is fed to an oxygen adsorbing material creating an oxygen lean stream, wherein said fuel is combusted with oxygen released from said oxygen adsorbing material, thereby creating a $CO_2$ rich combustion product.

2. The process according to claim 1, wherein the process further comprises at least partly converting CO and $H_2O$ present in the synthesis gas into $CO_2$ and $H_2$ before separating the synthesis gas.

3. The process according to claim 1, wherein the process further comprises feeding an air stream to an air separation unit, thereby creating a first stream with an increased oxygen content and a second essentially nitrogen containing stream and feeding said first stream to the oxygen adsorbing material and mixing at least part of said second stream with said hydrogen rich stream before combustion.

4. The process according to claim 3, wherein the process further comprises catalytically combusting at least part of said second stream together with a part of said hydrogen stream to generate a first essentially oxygen free nitrogen stream comprising some water and mixing said first essentially oxygen free nitrogen stream with the rest of said hydrogen stream.

5. The process according to claim 1, wherein the process further comprises catalytically combusting at least part of said oxygen lean stream together with a part of said hydrogen steam to generate a second essentially oxygen free nitrogen stream comprising some water and mixing said second essentially oxygen free nitrogen stream with the rest of said hydrogen stream.

6. The process according to claim 1, wherein the separation of the synthesis gas is obtained by pressure swing adsorption producing said rest stream at a pressure between 1-20 bar.

7. The process according to claim 1, wherein at least a part of said oxygen lean stream is expanded in said turbine for generating electric energy.

8. The process according to claim 3, wherein at least a part of said second essential nitrogen containing stream is expanded in said turbine for generating electric energy.

9. The process according to claim 1, wherein said $CO_2$ rich combustion product is expanded in a $CO_2$/$H_2O$ turbine for generating electric energy.

10. The process according to claim 9, further comprising combustion of uncombusted fuel in said $CO_2$ rich combustion product.

11. The process according to claim 1, wherein the separation of the synthesis gas is obtained by pressure swing adsorption producing said rest stream at a pressure between 1.5-5 bar.

12. An electric power plant comprising a steam reformer with an inlet for a hydrocarbon feedstock including one or more of water and steam and a synthesis gas outlet, said synthesis gas outlet is in communication with a hydrogen separation unit having a hydrogen rich and carbon lean stream outlet and a rest stream outlet, said hydrogen rich and carbon lean stream outlet is in communication with a combustion chamber for combusting hydrogen with compressed air having an outlet connected to a turbine for generating electric power, said rest stream outlet is in communication with a combustion unit heat-transferringly connected to said steam reformer, wherein the electric power plant plant further comprises an oxygen adsorbing material arranged inside the combustion unit, wherein said combustion unit comprises an inlet for an oxygen containing stream and an oxygen lean stream outlet and an exhaust outlet for a $CO_2$ rich exhaust stream.

13. The electric power plant according to claim 12, wherein the electric power plant plant further comprises a shift unit for at least partly converting CO and $H_2O$ present in the synthesis gas into $CO_2$ and $H_2$ arranged upstream from the hydrogen separation unit.

14. The electric power plant according to claim 12, wherein the electric power plant plant further comprises an air separation unit with an air inlet, an oxygen enriched stream outlet in communication with said inlet for oxygen containing stream and a nitrogen rich stream outlet in communication with said combustion chamber for combusting hydrogen.

15. The electric power plant according to claim 14, wherein the electric power plant further comprises a low temperature stimulated combustion unit comprising an inlet in communication with said nitrogen rich stream outlet and with said hydrogen rich and carbon lean stream outlet and comprising an outlet in communication with said combustion chamber for combusting hydrogen.

16. The electric power plant according to claim 12, wherein the electric power plant further comprises a low temperature stimulated combustion unit comprising an inlet in communication with said oxygen lean stream outlet and with said hydrogen rich and carbon lean stream outlet and comprising an outlet in communication with said combustion chamber for combusting hydrogen.

17. The electric power plant according to claim 12, wherein said oxygen lean stream outlet is in communication with an inlet to said turbine for generating electricity.

18. The electric power plant according to claim 12, wherein said nitrogen rich stream outlet is in communication with an inlet to said turbine for generating electricity.

19. The electric power plant according to claim 12, wherein $CO_2$ rich exhaust stream is in communication with a $CO_2$/$H_2O$ turbine that generates electricity.

* * * * *